Nov. 16, 1965  J. GENEST  3,217,364
APPARATUS FOR INJECTING GRANULAR MATERIAL INTO A MOLD
Original Filed May 24, 1961  2 Sheets-Sheet 1

INVENTOR.
JEAN GENEST
BY Bauer and Seymour
ATTORNEYS

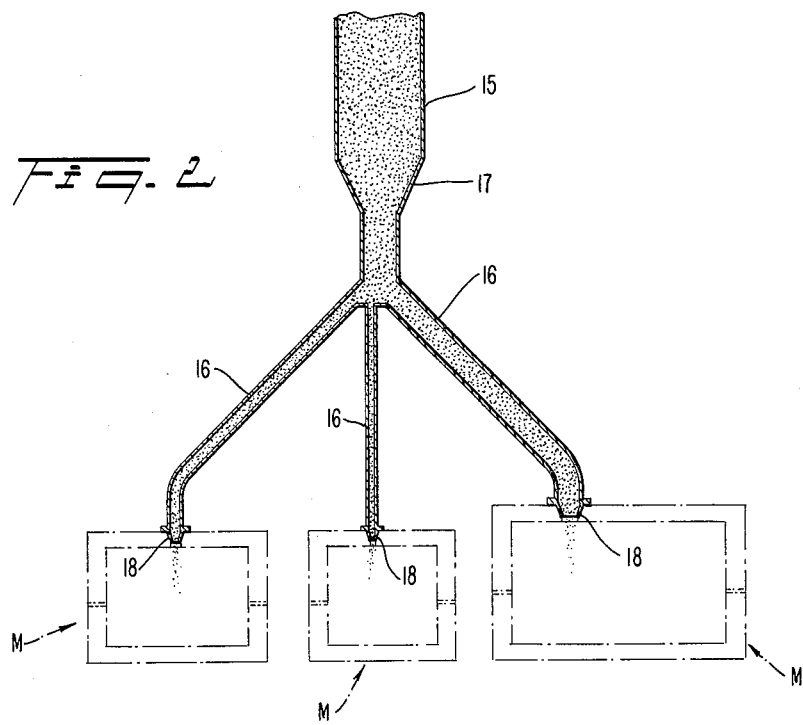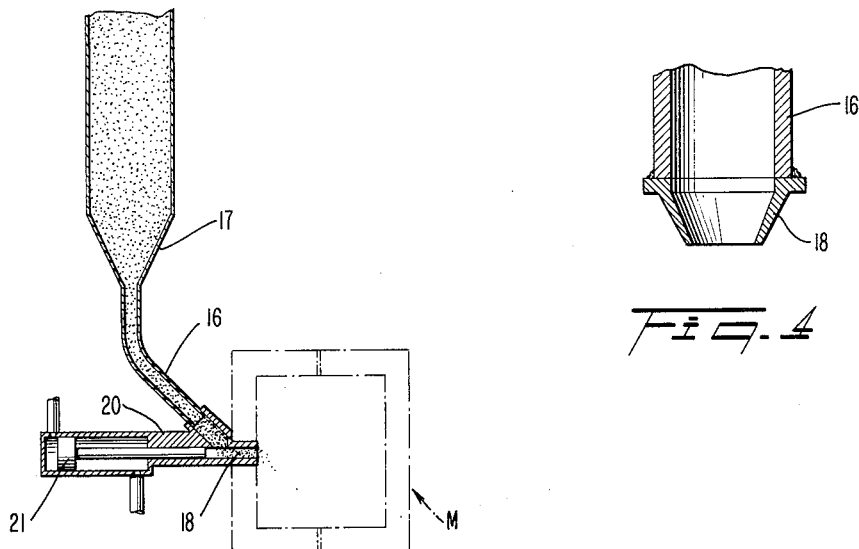

United States Patent Office 3,217,364
Patented Nov. 16, 1965

3,217,364
APPARATUS FOR INJECTING GRANULAR
MATERIAL INTO A MOLD
Jean Genest, Chambray Les Tours, France, assignor to
Compagnie de Saint-Gobain, Neuilly sur Seine, France
Continuation of application Ser. No. 112,369, May 24,
1961. This application Oct. 26, 1964, Ser. No. 409,346
Claims priority, application France, May 30, 1960,
828,587
13 Claims. (Cl. 18—30)

This application is a continuation of my application Ser. No. 112,369, filed May 24, 1961, now abandoned.

This invention relates to an apparatus for injecting granular material into a mold or the like. The invention involves an apparatus and has wide application to circumstances where a granular material must be delivered to and distributed throughout a container or mold. A particularly valuable use of the invention concerns the filling of molds with granules of plastic materials in the molding of shaped pieces and the invention will be described in connection with that use.

The apparatus in its preferred form may include two superposed containers, for example, a first container which receives the granular material to be delivered to the injection system, and an injection or second container which receives the granules from the first container. The two containers are attached to each other in closed fashion so that the granular material flows into the first and from it into the second, in the vicinity of the upper end of the latter, by gravity. The body or lower container, or injector, is provided at the other end with an injection nozzle having a conical part, the reduction of section and the angle of the conical part being a function of the nature of the granules, that is to say, of the size of the granules and the material of which they are made. For example, for very fine smooth granules which flow very freely, the internal angle of the conical part will be greater and the size of the discharge orifice smaller than when the granules are coarse in size and of materials which pack readily, i.e. more easily against each other to form a blocking bridge or plug. The injection nozzle is provided with an external shape which acts as a fitting adapted to cooperate with a complementary fitting at the orifice or sprue of the mold or other type of receptacle to be filled. It is advantageous to arrange the apparatus so that the smallest part of the orifice leading from the injector is in the vicinity of the orifice of admittance of the mold.

One of the characteristics of the invention is that the injector or, more properly, the aforesaid conical part, and the orifice of discharge are constructed or calibrated as a function of the size and material composition of the grains so that after the cavity of the mold is entirely filled, or if for example, the aperture of the discharge orifice is temporarily obstructed, the material forms a bridge across the discharge orifice and will not escape under the force of gravity. In order to secure its discharge to fill the mold, there is established behind the granular material sufficient gas pressure to force it out of the injector.

This rise in gas pressure causes the rupture of the bridge or blockage, followed by the expansion of the gas under pressure to violently project the material into the cavity to be filled, and assures a homogenous distribution of the material and a rapid and total filling of the mold.

The upper part of the novel apparatus, which serves to supply the injector, can be filled by any appropriate means such as by carrier, screw conveyor, vibration, or gaseous projection.

Between the injector and the supply container there is disposed, in the preferred form of the apparatus, a valve which can be closed in any appropriate way but which is preferably closed by the gaseous pressure which is generated at the injector for the purpose of blowing the granules into the mold. A preferred form of the invention is shown in the attached drawings wherein:

FIG. 2 represents schematically, in vertical section, an apparatus for the injection of granular material into a plurality of molds;

FIG. 3 is a schematic representation of an embodiment in the case of a wholly automatic operation; and FIG. 4 is an enlarged view of the discharge orifice and tubular conical configuration of the injection nozzle.

Figure 1:
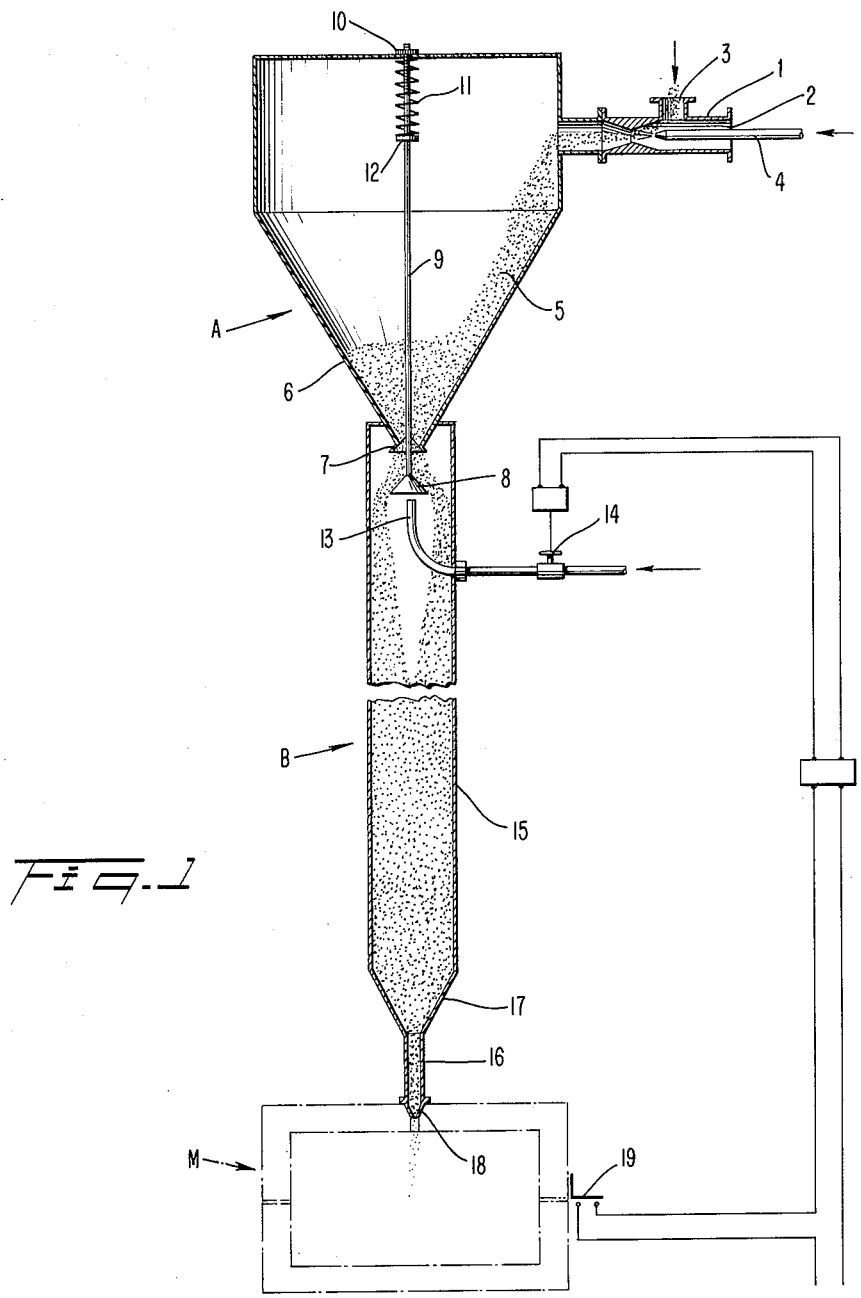
FIG. 1 represents schematically, in vertical section, an apparatus for injecting granular material into a mold.

Referring to the drawings in detail, A is the supply container, B is the injector or body, and M is the mold or molds to be charged, all being schematically shown. Supply container A is filled for example, by a gas-operated venturi tube which includes a tubular body 1 with the usual venturi construction, with an air orifice 2, a lateral orifice 3 for the admission of granular material, and a velocity gas discharge 4 which entrains the granular material and impels it into container A, which has a perforated cover. The lower portion of container A includes a cone 6 normally open at its lower extremity to permit granules 5 to fall by gravity into injector B, and which is sealed in an opening in the top of the injector. A conical valve seat 7 is provided, and a conical valve 8 carried by a rod 9, has a fitting seat so that when valve 8 engages seat 7 the injector is sealed except for the discharge orifice of the injection nozzle hereinafter described. Valve rod 9 pierces the cover of the feeding receptacle and is suspended by a head 10. A spring 11 bears against the cover and a washer 12, and normally maintains the valve in an open position. The tension of the spring can be regulated at the head 10, which is threaded for this purpose on the upper end of rod 9, so that the tension achieved affects the vertically upward force which must be applied to close the valve.

Under valve 8 is a pipe or conduit 13 adapted to deliver gas under pressure when valve 14 is opened. The jet or blast issuing upwardly from the end of the pipe is directed against valve 8 and operates to overcome the thrust of spring 11 and to close the valve.

Injector B comprises a tubular body 15 and a tube 16 extending downwardly from the lower end thereof. A conical portion or funnel 17 integrally connects the body and tube to provide a smooth faired connection between them. At its lower end, tube 16 terminates in a nozzle member 18. This nozzle member, as more clearly shown upon FIG. 4, is internally constructed inwardly and downwardly to form an injection or discharge orifice. Externally the member is shaped to form a seal with a cooperating seat about the filling opening or sprue of the mold, as clearly indicated upon FIGS. 1, 2 and 3. It is important to note that the apex angle of the internal constriction of nozzle member 18, and the size of its lower opening or orifice cooperate to form a bridge or plug of granules when the discharge orifice is temporarily obstructed or obturated, this plug preventing free gravitational flow of granules through the orifice. As an example, good results in the molding of expanded polystyrene were obtained with a conicity of the order of 60% between the interior diameters of the discharge orifice of member 18 and pipe 16.

In operation, the supply system of container A having been put into operation, granules 5 fall into the container and from it into the injector. At this time valve 8 is open under the action of spring 11. Tube 16 and member 18 are chosen in the preferred embodiment, as a function of the size of the granules and the material composition so as to enable the formation of a bridge or plug of material between each two successive fillings of the mold. This formation of a bridge across the constricted passage has the advantage of opposing the flow of material without utilization of a mechanical obturator and said bridge consequently remains in place until a sufficient pressure in the injector is applied. An injection of compressed air is then effected by opening valve 14 thereby first closing valve 8 against its seat and sequentially placing the material in the injector under pressure. This pressure causes the breaking of the dam or bridge across the constriction and projects the ganulated material violently into the mold. As the pressure builds up to a relatively high value as the injection occurs, the particles are blown violently into the mold and fill it completely. The mold will be provided with apertures which permit the escape of air but not of the granules. When the mold is filled up and a plug of granules has formed within the discharge orifice, valve 14 is closed to stop the injection of air into the injector. The pressure within the injector is rapidly reduced, air flowing out of the injector through the interstices between the granules forming the plug. Valve 8 opens under the action of the spring 11 to allow the granules from the container to fall into the injector.

The operation may be made wholly automatic by electrical control of valve 14, for example by a contact 19 made at the mold opening. Closing of valve 14 may also be automatic. The apparatus is not limited to that which has been described. In place of a single axial discharge pipe, several of them may be disposed about and leading from conical part 17 so that several molds may be simultaneously filled as shown in FIG. 2. Likewise filling container 6 may have several outlets to each of which is connected directly or indirectly an injector 15 each provided with a valve 8 to thus provide an apparatus of several simultaneously-operating units.

In order to avoid the manual closing of the mold after filling, it is possible to provide the discharge orifice of member 18 with a mechanical obturator 20, as shown in FIG. 3, automatically controlled, for example, by a jack 21 of any known type and which may be automatically controlled by movement of valve 14. It is also possible to provide injectors of variable capacity or which include the principle of telescopic extension or which include an interior means of modifying the capacity.

The apparatus is perfectly adapted to the manufacture of molded objects from plastic materials impregnated with swelling agents such as expanded polystyrene impregnated with petroleum ether. It is equally applicable generally to all granular or pulverulent materials because, in general, such materials may form bridges or blockages and thus stop the flow of material through the conical restricted section of the nozzle. In this operation it is to be noted that a small quantity of the granular material may be provided in excess of that which is needed to fill the mold so that the material-blocking effect may be obtained.

The following table gives the results obtained in the filling of molds with beads of expanded polystyrene with an apparatus according to the present invention:

|  | Volume to Fill (in litres) | | | |
| --- | --- | --- | --- | --- |
|  | 3 | | 0.7 | |
| Average density of the beads in grams/litre, about | 20 | 35 | 20 | 35 |
| Average diameter of the beads in mm., about | 4 | 2 | 4 | 2 |
| Rupture pressure in kg./cm.², about | 4 | 5 | 4.2 | 5.5 |
| Diameter of the discharge orfice in mm | 8 | 8 | 8 | 8 |
| Filling time in seconds, about | 1½ | 1¾ | 1 | 1½ |

In certain applications of the process one may use molds provided with small perforations which permit the penetration of the vapor in the course of the thermal treatment necessary to molding, and serve, in addition, for the evacuation of air introduced during molding not all of which may have escaped.

As many apparently widely different embodiments of the present invention may be made without departing from the spirit and scope thereof, it is to be understood that the invention is not limited to the specific embodiments herein shown and described.

What is claimed is:

1. In an injector for injecting into a mold, a granular material to be molded therein, a vertically disposed tubular body terminating at its lower end in a downwardly and inwardly constricted funnel, a pipe of lesser cross-sectional area than said body and extending downwardly from and forming a continuation of the lower end of said funnel, said pipe terminating at its lower end in a downwardly and inwardly constricted nozzle, said pipe and nozzle being constructed and arranged to form a slug of granular material therein, a supply container in communication with the upper end of said body, a first valve between said container and body, and movable from a first open position to a second position cutting off communication between said container and body, means yieldingly urging said first valve to said first position, enabling the free flow of granular material from said container into said body, a conduit connected with said body for conducting compressed air thereinto, said conduit having its terminus within said body disposed to move said first valve to its said second position, by and in response to a blast of compressed air issuing therefrom.

2. The injector of claim 1, a second normally closed valve in said conduit, and means responsive to positioning of a mold in communication with said nozzle, to open said second valve.

3. The injector of claim 1, said container including a downwardly and inwardly constricted wall terminating in a horizontal valve seat within said body, said first valve comprising a vertical valve rod extending centrally through said seat into said body, and a hollow conical valve member fixed with the lower end of said rod, in said body, and movable from said first position upwardly into said second position in contact with said seat, the terminus of said conduit being directed upwardly contiguous to said valve member to direct a blast of compresesd air thereagainst, said means comprising a spring connected with and urging said rod downwardly to open position.

4. In an injector for injecting into a mold, granular material to be molded therein, a vertically disposed tubular body, a pipe of cross-sectional area less than the corresponding area of said body and in communication with and leading from the lower end of said body and terminating in a downwardly and inwardly constricted nozzle, a supply container above said body, a valve seat at the lower end of said container and defining an opening through which granular material may pass therefrom into said body, a valve movable from a first open position free of said opening, to a second position on said seat and closing said opening, means yieldingly urging said valve into said first position, and a pipe connected with said body to conduct compressed air thereinto and disposed to move said valve to said second position by and in response to compressed air issuing from the terminus of said pipe within said body.

5. The injector of claim 4, at least one additional pipe leading from the lower end of said body, and of cross-sectional area less than the corresponding area of said body, each said additional pipe terminating in a nozzle, all said nozzles being adapted for connection with the sprue of a respective one of a corresponding number of discrete molds.

6. The injector of claim 4, a valve member movable from a first position closing said nozzle to prevent the flow of material therefrom, to a second position opening the same, and a double-acting jack connected with said valve member and controllable to positively move said valve member between said first and second positions.

7. Injection apparatus comprising container means having access means for admitting granules therein, at least one member coupled to said container and having a tubular conical inner configuration to allow free passage of the granules of said container therefrom, the size of the discharge orifice of said member and the conical angle of said configuration being a function of the size and composition of the granules to cause the granules in said member to be compacted and form a blockage to said free passage whenever said discharge orifice is obturated and to maintain said blockage when said obturation ceases, and pressure means for removing said blockage to discharge the granules in said container therefrom.

8. Injection apparatus according to claim 7 wherein said access means comprises an input valve, said pressure means being further adapted to close said input valve.

9. An apparatus for delivering granular material to a location comprising a container provided at or towards its upper end with a closable inlet for the material, a nozzle at the lower end of the container having a discharge opening of reduced section which is dimensioned as a function of the grain size and nature of the material so as to be capable of permitting the material to flow therethrough under its own weight and when the mouth thereof is temporarily closed off causing the material to compact into a plug obturating the nozzle, said plug being maintained when said mouth is reopened, and means for producing an excess gaseous pressure within the container capable of breaking up a plug of compacted material obturating the nozzle and of expelling the material within the container therethrough.

10. Apparatus according to claim 9 wherein the container inlet is closable by a valve actuated by said gaseous pressure.

11. Apparatus according to claim 9 wherein the container inlet is formed by the outlet of a hopper.

12. Apparatus according to claim 9 wherein the gaseous pressure is produced by feeding a gas under pressure into the container.

13. Apparatus according to claim 9 wherein means is provided automatically to cause the gas to enter the container when the latter is brought to the delivery location.

References Cited by the Examiner
UNITED STATES PATENTS

| | | | |
|---|---|---|---|
| 2,611,938 | 9/1952 | Hansberg. | |
| 2,825,107 | 3/1958 | Schueler. | |
| 2,839,787 | 8/1958 | Stevens | 18—30 |
| 2,952,876 | 9/1960 | Miles | 18—30 |
| 3,051,994 | 9/1962 | Carozzo | 264—328 |
| 3,052,925 | 9/1962 | Bronnenkant | 264—328 |
| 3,094,249 | 6/1963 | Pullen | 222—193 |
| 3,179,134 | 4/1965 | Sigrist | 141—67 |

J. SPENCER OVERHOLSER, *Primary Examiner.*

ROBERT F. WHITE, *Examiner.*